US012286275B2

(12) United States Patent
Thompson et al.

(10) Patent No.: US 12,286,275 B2
(45) Date of Patent: Apr. 29, 2025

(54) ROOF VENT PACKAGE AND RELATED METHOD OF USE

(71) Applicant: American Flashings and Accessories, LLC, Bailey, MI (US)

(72) Inventors: Jacob M. Thompson, Grant, MI (US); Nathan L. Thompson, Grant, MI (US); Leon W. Thompson, Kent City, MI (US)

(73) Assignee: American Flashings and Accessories, LLC, Bailey, MI (US)

( * ) Notice: Subject to any disclaimer, the term of this patent is extended or adjusted under 35 U.S.C. 154(b) by 166 days.

(21) Appl. No.: 18/210,979

(22) Filed: Jun. 16, 2023

(65) Prior Publication Data

US 2024/0417139 A1 Dec. 19, 2024

(51) Int. Cl.
*B65D 85/46* (2006.01)
*B65D 30/22* (2006.01)
*B65F 1/00* (2006.01)

(52) U.S. Cl.
CPC ............ *B65D 31/12* (2013.01); *B65F 1/0006* (2013.01)

(58) Field of Classification Search
CPC ......... B65D 85/46; B65F 1/0006; E04D 1/36; E04D 13/176
USPC ......... 206/321, 323–324, 527; 383/4, 84, 86
See application file for complete search history.

(56) References Cited

U.S. PATENT DOCUMENTS

| | | | | |
|---|---|---|---|---|
| 6,039,646 A * | 3/2000 | Sells | E04D 3/40 | 454/365 |
| 6,224,260 B1 * | 5/2001 | Nickell | B65D 88/20 | 383/119 |
| 6,547,126 B2 * | 4/2003 | Freiborg | B65D 5/6626 | 206/323 |
| 7,510,327 B2 * | 3/2009 | Williams | B65F 1/0006 | 383/117 |
| 2007/0072539 A1 * | 3/2007 | Sells | E04D 13/174 | 454/365 |
| 2009/0272663 A1 * | 11/2009 | Koch | B65D 71/0096 | 206/499 |

(Continued)

OTHER PUBLICATIONS https://www.homedepot.com/p/DURASACK-200-Gal-Heavy-Duty-Builder-s-Bulk-Bag-White-Outdoor-Polypropylene-Construction-Trash-Bag-BB-40CTN/315038578#overlay, downloaded Sep. 10, 2023.

(Continued)

*Primary Examiner* — Luan K Bui
(74) *Attorney, Agent, or Firm* — Warner Norcross + Judd LLP

(57) ABSTRACT

A roof vent package provides dual functionality to transport and store roof vents, such as ridge vents, and to offer a disposal receptacle for jobsite debris. The package can include a ridge vent bag constructed from a flexible material to include multiple sidewalls, a closure flap that selectively covers an opening of a compartment in which ridge vents are stored, and a closure flap with a closure element to maintain the closure flap in a closed configuration over the opening. A related method includes storing and transporting ridge vents in the compartment of the bag, operating the closure flap to open the compartment and gain access to the ridge vents, removing the ridge vents from the compartment, and placing jobsite debris in the compartment of the ridge vent bag, where the ridge vents were previously located, to store the jobsite debris in the ridge vent bag for later disposal.

18 Claims, 12 Drawing Sheets

(56) References Cited

U.S. PATENT DOCUMENTS

| | | | | |
|---|---|---|---|---|
| 2014/0193100 | A1* | 7/2014 | Sigrist | B65B 25/143 383/41 |
| 2020/0240148 | A1* | 7/2020 | Van Wey | E04D 1/36 |

OTHER PUBLICATIONS https://www.homedepot.com/p/Ultrasac-42-Gallon-Heavy-Duty-Contractor-Bag-with-Flaps-50-Count-HMD-719963/100127524, downloaded Sep. 10, 2023.

* cited by examiner

ROOF VENT PACKAGE AND RELATED METHOD OF USE

BACKGROUND OF THE INVENTION

The present invention relates to vents, and more particularly to a roof vent package for transporting roof vents and further jobsite use after such transport.

Many building roofs are outfitted with vents to promote ventilation and evacuate heat and moisture from the upper extremities of buildings. A common type of vent for building roofs is a ridge vent, which is installed over an opening, typically defined at the peak or ridge of a roof, where two roof surfaces come together. Such ridge vents allow air to escape from the space under the roof to reduce heat and potential moisture buildup in that space under the roof. Most ridge vents are of an elongated form, and typically have dimensions of about one foot to one and a half feet in width, and four feet to six feet in length. When in this elongated form, the ridge vents commonly are referred to as stick ridge vents.

Stick ridge vents usually are packaged and delivered to a jobsite in rectangular cardboard boxes. The boxes contain ten or more ridge vents. The boxes typically are opened on the roof (or sometimes on the ground) to access the stick ridge vents, and then later thrown off the roof or discarded on the ground. After the ridge vents are installed, or generally after the roofing job is completed, workers must go around the jobsite and collect all the cardboard boxes. Frequently, the workers will spend some time crushing or disassembling the boxes, so that they take up less volume for disposal or transport. The boxes are then thrown in a jobsite dumpster or prepared for transport on a trailer or vehicle, for disposal in a landfill or in some cases, recycling.

Accordingly, the present primary packaging for ridge vents presents some issues regarding jobsite tidiness and disposal, as well as sustainability. In addition, some ridge vent boxes can be stored and transported rather roughly and can become beat up and ragged. Such ragged boxes might not be appealing to a building owner on whose building the ridge vents are being installed. The boxes also can become wet in the environment, in which case the cardboard can deform or weaken. This can cause the containment capabilities of the boxes to deteriorate. In turn, the boxes might not be able to perform their primary function to transport and store the ridge vents.

Accordingly, there remains room for improvement in the field of packaging for roof vents.

SUMMARY OF THE INVENTION

A roof vent package provides dual functionality to transport and store roof vents, and to offer a disposal receptacle for jobsite debris.

In one embodiment, the roof vent package can be configured to store and transport ridge vents for roofs. The package can include a ridge vent bag that can be constructed from a flexible material. The ridge vent bag can include multiple sidewalls, a closure flap that selectively covers an opening of a compartment in which ridge vents are stored, and a closure flap with a closure element to maintain the closure flap in a closed configuration over the opening.

In another embodiment, the closure element can include a first strap along an end of the closure flap that is folded over the opening of the compartment. The closure flap can overlap the second sidewall of the ridge vent bag. The first strap can be tied to but configured to be untied from a second strap joined with another sidewall to remove the closure flap from the opening and expose and/or access the ridge vents in the compartment.

In still another embodiment, the closure element can include an adhesive disposed on a first surface of the closure flap. The adhesive can adhere the closure element to the second wall. The adhesive element can be configured to be compromised to disassociate the closure flap from the second sidewall to access the opening.

In yet another embodiment, the sidewalls and closure flap can be constructed from a flexible polymeric fabric. The fabric can wrap and conform to the contours of the ridge vents stored inside the compartment of the bag. The bag can be flexible enough that it can be collapsed and rolled upon itself after the ridge vents are removed therefrom, to take on different sizes and dimensions.

In even another embodiment, the first sidewall, the second sidewall and the closure flap of the bag can be a continuous, homogeneous single piece of the flexible material that extends along a longitudinal axis of the ridge vent bag. The bag can include a third sidewall and a fourth sidewall. The third sidewall can be sewn to the first sidewall and the second sidewall on one side of the longitudinal axis of the ridge vent bag, while the fourth sidewall can be sewn to the first sidewall and the second sidewall on another side of the longitudinal axis of the ridge vent bag.

In a further embodiment, a method is provided. The method can include storing and transporting ridge vents in the compartment of the bag, operating the closure flap to open the compartment and gain access to the ridge vents, removing the ridge vents from the compartment, and placing jobsite debris in the compartment of the ridge vent bag, where the ridge vents were previously located, to store the jobsite debris in the ridge vent bag for later disposal.

In still a further embodiment, the method can include transporting the ridge vent bag containing the jobsite debris to a jobsite disposal area, and disposing of the bag and debris together, as one unit.

In yet a further embodiment, the closure element can include a first strap tied to the second strap to secure the closure flap in the closed position over the opening. The removing step can include untying the first strap from the second strap.

In even a further embodiment, the method can include exposing a receiver pocket that is contiguous with the compartment after the removing step. The receiver pocket can be located adjacent multiple ridge vent ends of the multiple ridge vents.

In another embodiment, the method can include removing fasteners stored in the receiver pocket adjacent the ridge vent ends. This can occur before removing the multiple ridge vents. After the fasteners are removed from the bag, they can be installed through each of the plurality of ridge vents to secure the ridge vents to a peak or ridge of a roof of a building.

The current embodiments provide a roof vent package that avoids wasteful use of large, bulky cardboard boxes for roof vents on a jobsite. The package and method herein also repurpose the bag of the package from a storage unit for the ridge vents, to a jobsite trash bag. This is the opposite of prior ridge vent packaging, mostly in the form of cardboard boxes, which merely produced more jobsite trash and debris. Indeed, the prior ridge vent packaging itself needed to be picked up and disposed of at a jobsite disposal area, which produced more work and consumed more disposal space for jobsite debris.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
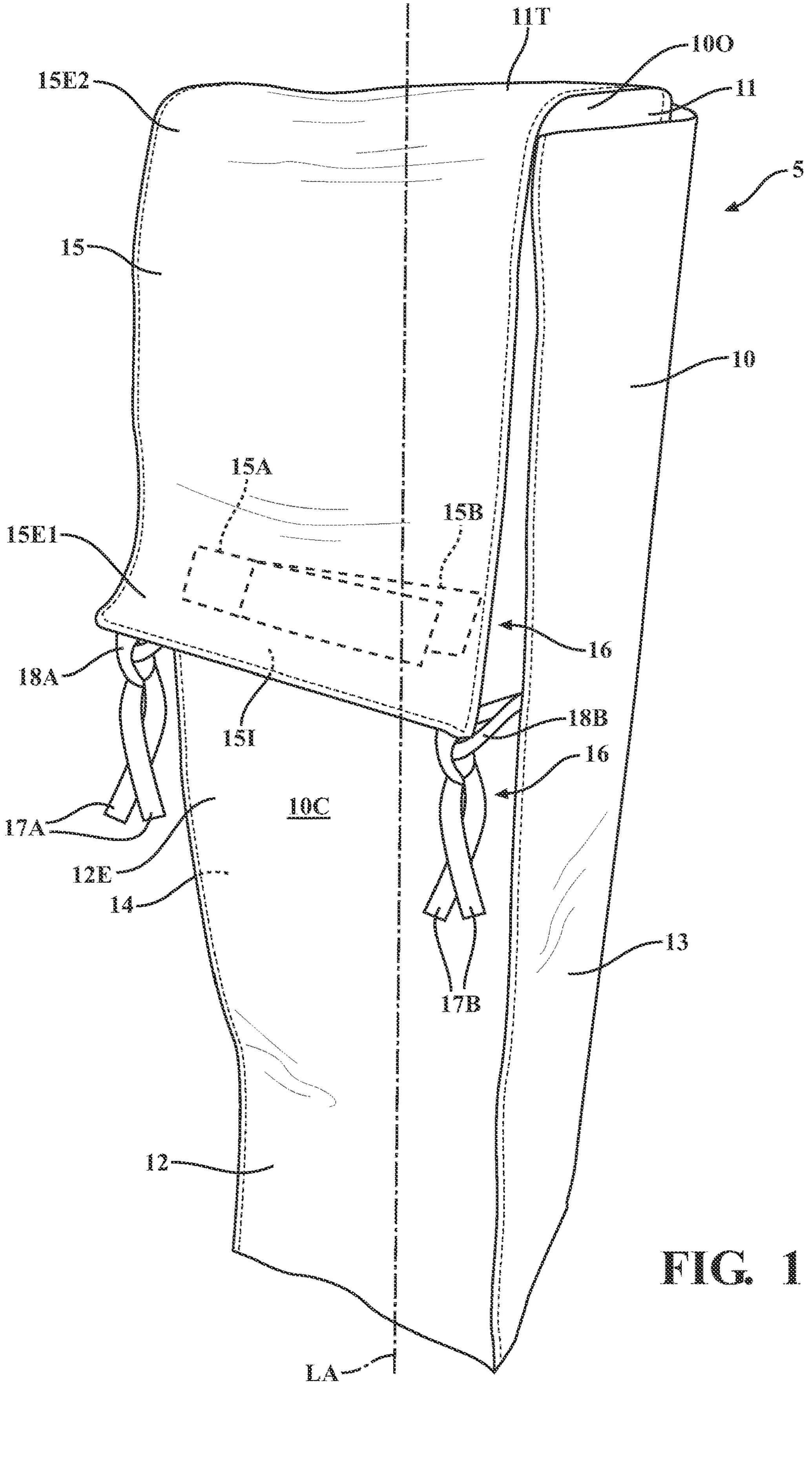
FIG. 1 is a perspective view of the roof vent packaging of a current embodiment in the form of a ridge vent bag.

A current embodiment of the roof vent package is shown in FIGS. 1-6 and generally designated 5. The roof vent package 5 is shown in the form of a roof vent bag 10, referred to herein as a ridge vent bag, that is operable in a package mode in which it functions to store and transport multiple individual stick ridge vents 20 and/or fasteners 95 as described below, and in a trash mode, in which it functions to collect and store jobsite debris DB. Due to the ridge vent bag's construction from a flexible, dynamic and/or non-rigid material as described below, the bag can be easily removed from the ridge vents or vice versa, and easily collapsed, deformed or rolled up after use in the package mode, or in the trash mode, depending on the application.

In the package mode, the ridge vent bag 10 as illustrated can be used to transport multiple individual ridge vents 20 stacked one upon another and stored within an internal compartment 10C of the ridge vent bag. Although described in connection with ridge vents, the roof vent package 5 and ridge vent bag 10 can come in a variety of shapes, sizes and configurations to accommodate many different types of roof vents, ridge vents, roofing materials, siding materials, flashings, accessories and other construction components in the package mode. As described below, the ridge vent bag 10 when in the trash mode, can be configured, deformed, collapsed or otherwise manipulated to receive, contain or store jobsite debris DB, which can include roofing materials such as shingle scraps, felt scraps, underlayment scraps, fasteners, wood scraps, metal scraps, ridge vent scraps, plastic scraps, paper packaging, plastic packaging, cardboard packaging and/or a variety of other types of debris, trash and leftover components that might be left on a building jobsite during construction of a building, all of which can be referred to herein as jobsite debris.

The construction and components of the ridge vent bag 10 shown in FIGS. 1, 2, 5 and 6 will now be described. As mentioned above, the ridge vent bag 10 can be constructed from a flexible and non-rigid material. This material can be in the form of a one or more polymeric, plastic, woven or non-woven flexible sheets of material that are joined with one another to form the bag. In some cases, the flexible material can be in the form of a fabric, shown for example in 5A, which includes multiple individual polymeric strands 10F1 and 10F2 that are woven together using a conventional weaving process in which the strands are generally in an array and perpendicular to one another. The strands can be constructed from a polymeric material, a natural or synthetic material or some other material. When constructed from a polymeric material, strands and or the bag itself can be constructed from polyethylene plastic sheeting. Each individual strand can be generally flexible and unable to support its own weight without bending or flexing. Each individual strand can have a certain tensile strength, tear strength and elasticity. Generally, when combined, the strands form a sheet of material that is of a thickness T1 that is optionally less than 10 millimeters, less than 8 millimeters, less than 5 millimeters, less than 4 millimeters, less than 2 millimeters, between 5 millimeters and 12 millimeters, inclusive, between 3 millimeters and 10 millimeters, inclusive, or between 3 millimeters and 5 millimeters, inclusive, depending on the application and materials to be transported or stored in the bag.

Figure 2:
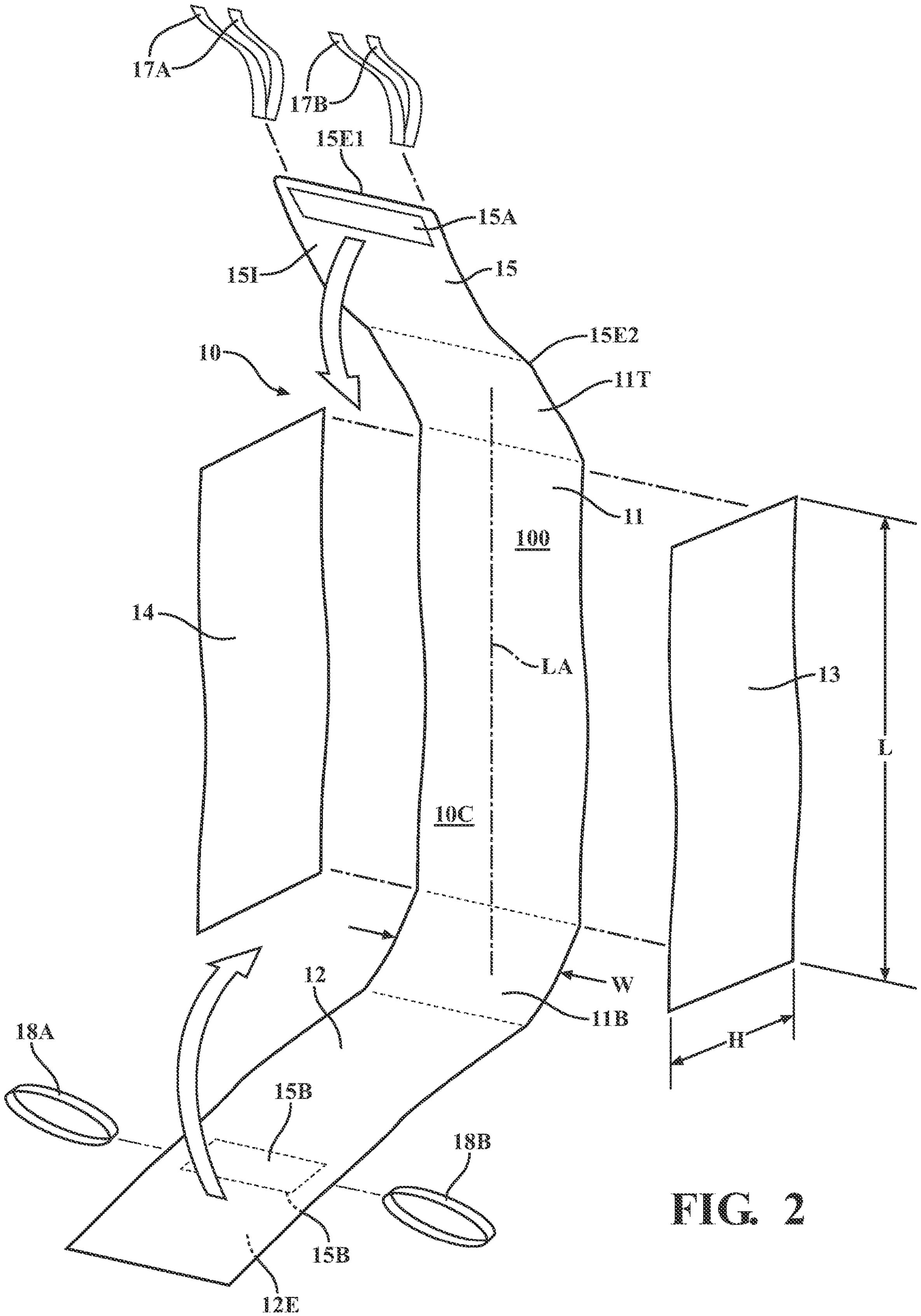
FIG. 2 is a perspective view of the ridge vent bag components before assembly of the bag.

As mentioned above, the bag can be constructed from multiple individual sheets or layers. The sheets or layers as shown in FIGS. 1 and 2 can be constructed to form multiple sidewalls around an internal compartment for storing the ridge vents. In particular, as shown in FIGS. 1 and 2, the ridge vent bag 10 can include a first sidewall 11, a second sidewall 12, a third sidewall 13 and a fourth sidewall 14. The first and second sidewalls can lay on opposite sides of the longitudinal axis LA of the bag. The third and fourth sidewalls can also lay on opposite sides of the longitudinal axis LA. The sidewalls can be shaped and dimensioned to form the bag having a particular length L, height H and width W. The length L can be optionally 1 foot to 6 feet, inclusive, 2 feet to 5 feet, inclusive, 2 feet to 4 feet, inclusive, or other lengths depending on the length of the ridge vents to be transported in the bag 10. The height H of the bag and the respective third and fourth sidewalls can be optionally 6 inches to two feet, inclusive, 1 foot to 1 foot 6 inches, inclusive, about 1 foot, about 2 feet, less than 2 feet, or other dimensions depending on the application and the number of ridge vents to be stacked upon one another and stored within the bag 10. The width W of the bag 10, as well as the width W of the first sidewall 11, second sidewall 12, top 11T, bottom 11B and in some cases the closure flap 15, can be optionally at least 24 inches, at least 18 inches, at least 12 inches, 6 inches to 24 inches, inclusive, 12 inches to 24 inches, inclusive, 12 inches to 18 inches, inclusive, or other widths depending on the widths of the ridge vents to be stored, transported or otherwise contained in the bag 10.

As shown, the third 13 and fourth 14 sidewalls can be independently and separately formed from the first sidewall 11 and second sidewall 12, which can be formed in a continuous, single piece. The first sidewall 13 and second sidewall 14 can be rectangular sheets or panels that can be joined at their respective margins via sewing, adhesion, welding, fastening, stapling or other conventional techniques to the first and second sidewalls. The first sidewall 11 can extend upward from a bottom 11B to a top 11T. The first sidewall 11 can be parallel to the second sidewall 12 when the bag is assembled. Likewise, the third sidewall 13 and fourth sidewall 14 can be parallel to one another. The bottom 11B and top 11T can also be parallel to one another. Optionally, the respective sidewalls, top and bottom also can be perpendicular to other components.

In some cases, the top 11T and bottom 11B can simply be extensions of the respective first sidewall 11 and/or second sidewall 12. The top 11T can also form and/or extend to a closure flap 15. The closure flap 15 can extend from the first sidewall to cover an opening 100 of the ridge vent bag 10. This opening can be sized so that respective ridge vents 20 can be placed in the ridge vent bag and removed therefrom. Generally, the opening 100 can be covered by the closure flap 15 which again can include the top 11T. The closure flap tunnel which again can be a flexible, bendable flap of the sheet of material from which the bag is constructed, can be folded over, is generally disposed over the opening 100 that leads to the internal compartment 10C of the bag 10. The closure flap can extend from a first end 15E1 to a second end 15E2 which can be connected, joined with, or otherwise integrally formed with the top 11T of the bag 10. The closure flap 15 can be constructed so that it extends downward and adjacent the second sidewall 12 when the bag is in the package mode, or the flap is in the closed mode to close the bag so that materials and items cannot be removed through the opening 100 of the bag 10. The closure flap also can be modified to an open mode, shown in FIGS. 5 and 6, in which the opening 100 opens to expose the compartment 10C within the bag 10.

The closure flap 15 shown in FIGS. 1 and 2 can extend to the end 15E as described. This end 15E can include one or more closure elements 16. As shown, one closure element that can be used with the bag 10 can be an adhesive element, including one or more adhesive patches 15A and/or 15B. The adhesive patches 15A and 15B can be disposed on the respective flap 15 and/or the second sidewall 12. As shown, the adhesive element can include a first patch 15A on the interior surface 151 of the flap 15. The adhesive element can include a second patch 15B on the exterior 12E of the second sidewall 12. The adhesive patches can include a tacky, reusable adhesive, glue, cement or other material that can permanently or temporarily secure the closure flap to the sidewall to maintain the closure flap in the closed position shown in FIG. 1. Upon sufficient application of a tear force via a user pulling on the flap 15, the first and second adhesive patches 15A and 15B can separate or detach from one another, allowing the closure flap 15 to be moved to the open mode shown in FIGS. 5 and 6. The adhesive patches 15A and 15B can generally be disposed in alignment with the end 15E1 of the closure flap 15. Of course in other cases, the adhesive elements can be disposed somewhere along the closure flap 15.

Further optionally, although shown as adhesive patches, the closure elements or adhesive elements can be in the form of hook and loop fastener strips that are stitched to the closure 15 and the sidewall 12 to interface with one another to hold the closure flap in a closed mode. In yet other applications, the closure flap can include small pockets or recesses that contain magnets, while the sidewall 12 likewise includes corresponding magnets or ferrous materials such that the magnets will attract and thereby hold the closure flap closed via a magnetic force. Other constructions for the closure elements are contemplated.

In addition to, or as an alternative to the adhesive element, the closure element 16 can include one or more first straps 17A and 17B. The first straps can extend from the closure flap and in particular from the first end 15E1 of the closure flap that is distal from the opening 100. The first straps can be stitched, sewn, glued, stapled, fastened or otherwise secured to the end 15E1 of the closure flap 15 or somewhere between that end 15E1 and the second end 15E2 in a location that simply allows the closure flap 15 to overlap the second sidewall 12 or generally close the opening 100. The first straps can be constructed from a flexible material, which may or may not have elasticity. The closure element 16 can include one or more second straps 18A and 18B that can be secured to the second sidewall 12 and/or the third or fourth sidewalls 13 and 14. The second strap optionally can be in the form of loops 18A and 18B as shown in FIG. 2. The loops can be formed simply by folding a linear strap over upon itself and stitching its opposing ends to one another and to the respective sidewalls.

The closure flap 15 can be secured over the opening 10 and maintained in a closed mode via the first and second straps being tied to one another using any one of a number of conventional knots or securement means for tying structures to one another. Of course, to allow the closure flap to open relative to the opening 100, the first strap and second strap can be untied from one another by user. After the straps are untied from one another, the closure flap can be opened to the open mode shown in FIGS. 5 and 6 to gain access to the internal compartment and/or a receiver pocket as described below.

The sidewalls and/or other panels or sheets that make up the bag can be secured to one another along one or more seams. As shown in FIG. 5A, an exemplary seam 10S joins the second sidewall with the fourth sidewall 14. The fourth sidewall 14 can include a margin 14M terminating at an edge 14E. This margin can be placed within a fold or pocket 12P of the second sidewall 12. This pocket 12P can be formed by first minor panel 12M1 being folded relative to a major panel 12T of the sidewall 12. The minor panel 12M1 can transition to a second minor panel 12M2 which can be bent at an acute angle A1 relative to the first minor panel 12M1. The margin 14M of the sidewall 14 can be placed within the pocket, generally between the first minor panel 12M1 and second minor panel 12M2, within the angle A1. When in this position, a stitching 12S can be sewn through the first minor panel 12M1, the margin 14M and the second minor panel 12M2 along the seam 10S generally along the length of the sidewalls to secure those sidewalls to one another. Similar seams can be used in different areas of the bag, joining sidewalls, tops, bottoms, closure flaps, etc., to one another. Of course, the various sidewalls and panels or sheets of the bag can be joined using other structures and techniques such as gluing, cementing, welding, melting and/or fusing the various components to one another. In yet other constructions, the sidewalls, top, bottom, closure flap, etc., can be joined with one another in an integral one piece form.

Optionally, the straps 17A, 17B, 18A, 18B can be used for other functions besides securing the closure flap 15 over the opening 100. For example, in some cases, the straps can be tied to a truss, fascia or another component of a roof and/or building temporarily securing the bag 10 thereto.

As mentioned above and shown in FIGS. 1-6, the bag 10 can define an internal compartment 10C. This internal compartment can be sized and dimensioned to receive multiple individual roof vents, which as shown are in the form of stick ridge vents 20. The internal compartment 10C optionally can include and/or be contiguous with a receiver pocket 10P that is disposed closer to the opening 100, shown in FIGS. 5 and 6, than the compartment 100. This receiver pocket 10P can be disposed above the ends 20E of the vents 20 disposed in the compartment 10C. The receiver pocket 10P can be used to store additional objects or items that can be utilized with the ridge vents 20 or generally in connection with their construction and attachment to a roof. As an example, the pocket 10P can be used to store additional fasteners 96F1, 96F2, and 96F3. The fasteners as shown can be in the form of collations of fasteners, such as collations of roofing nails 96F1 and 96F2. In other cases, the fasteners can be in the form of boxes of nails or fasteners shown at 96F3.

The fasteners 96F1, 96F2, 96F3 optionally can be stored and/or precisely positioned or packaged in a frame 97. This frame can be constructed from cardboard, foam, crushed paper, packing paper, packing tissue, packing peanuts, a plastic tote or box or other structure. The frame 97 optionally as shown can include individual recesses that accommodate the respective fasteners 96F1, 96F2, and 96F3. The recesses or pockets can be sized and dimensioned to precisely hold and contain the fasteners or other elements that are stored in the frame 97 so that they do not slide around and move or otherwise damage the bag or the underlying ridge vents 20.

Figure 6:
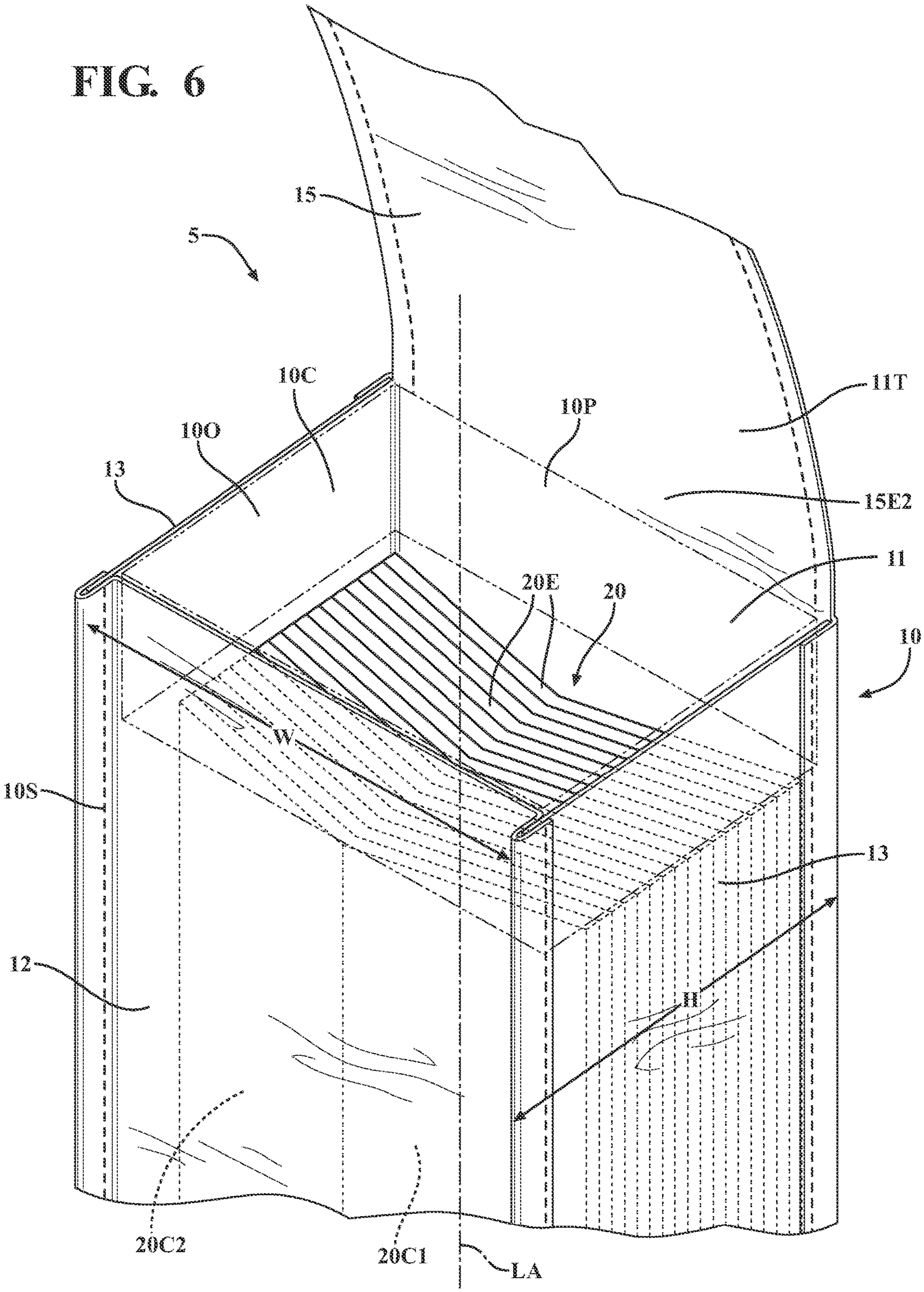
FIG. 6 is a perspective view of an opening of the ridge vent bag to provide access to multiple ridge vents in a compartment of the ridge vent bag.

Optionally, the ends 20E of the ridge vents 20 can form the bottom of the receiver pocket 10P. In other cases, the bag might include another panel or sheet that forms this bottom so that the frame 97 or the fasteners in the receiver pocket 10P do not contact the ridge vents 20. In other cases, the frame 96 can be absent and the fasteners or other items in the receiver pocket 10P can simply be disposed on or adjacent and contacting the ends 20E of the ridge vents 20 disposed in the compartment 10C. The receiver pocket 10P can be further bounded by the respective portions 11P, 12P, 13P, 14P of the respective sidewalls 11, 12, 13 and 14. The uppermost portion of the receiver pocket 10P which corresponds to the opening 100 of the bag, can be covered by the closure flap 15 in the closed mode. The receiver pocket 10P optionally can be accessed by opening the closure flap 15 to the open mode to expose the opening 10P and thus the receiver pocket 10P. Of course, in some applications, this receiver pocket can be absent, such that the opening 100 opens directly to the ends of the ridge vents 20E. It will be appreciated that after the frame 97 and/or any of the respective fasteners or other items disposed in the pocket 10P are removed, the ends 20E of the vents 20 are exposed and ready for removal as shown in FIG. 6. Optionally, the receiver pocket can be of a depth D2 that is optionally less than ½, less than ¼, or less than ⅛ of the overall length L of the bag 10.

The ridge vent bag 10 can be used to store a variety of roofing products in the package mode. As shown, the ridge vent bag 10 stores multiple ridge vents 20 within the compartment 10C in the package mode. As shown, the bag and compartment can store at least 5, at least 6, at least 7, at least 8, at least 9, at least 10, at least 11, at least 12, at least 13, at least 14, at least 15, at least 20 individual ridge vents 20 within the compartment 10C. The individual ridge vents can be stacked one upon the other and can extend the full length or at least a portion of the length L of the bag when in the internal compartment 10C.

Figure 7:
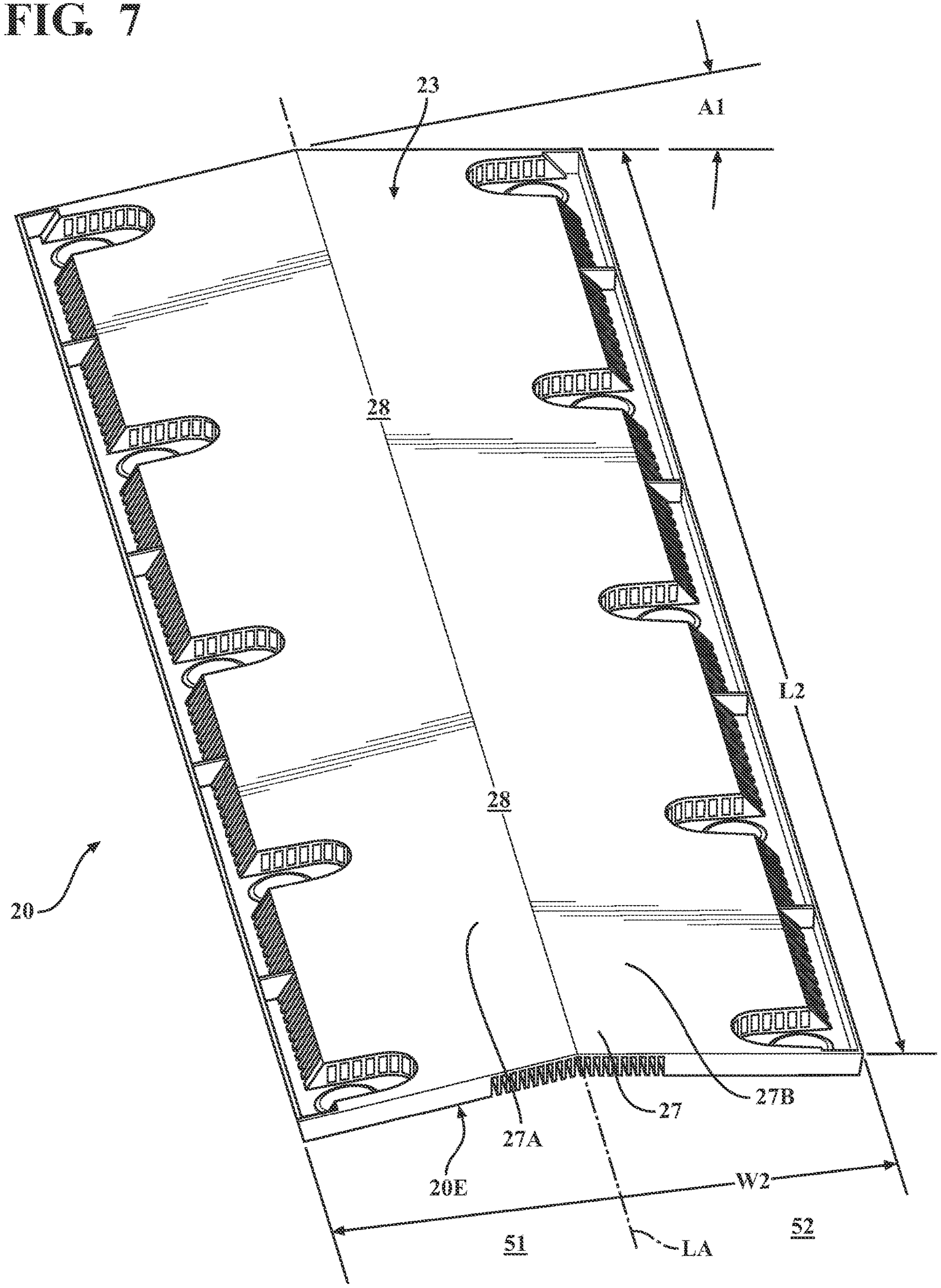
FIG. 7 is a perspective view of an exemplary roof vent in the form of a ridge vent that can be stored and transported in the ridge vent bag.

Optionally, the ridge vents 20 that can be stored and transported in the ridge vent bag 10 are shown and described in U.S. patent application Ser. No. 18/086,129, filed Dec. 21, 2022, entitled “Building Ridge Vent System,” which is hereby incorporated by reference in its entirety. In general, as shown in FIG. 7, each of the ridge vents 20 can include a body 23 including a first side 51 and a second side 52 opposite the first side, as well as the longitudinal axis LA. The ridge vents can be of a length L2 and a width W2, each of which can be less than the length L of the bag and the width W of the bag respectively. Optionally, the ridge vents can have a length L2 greater than their width W2. In this format, the ridge vents can be in the form of stick ridge vents that can be easily manipulated and placed relative to a roof peak 100P.

Figure 3:
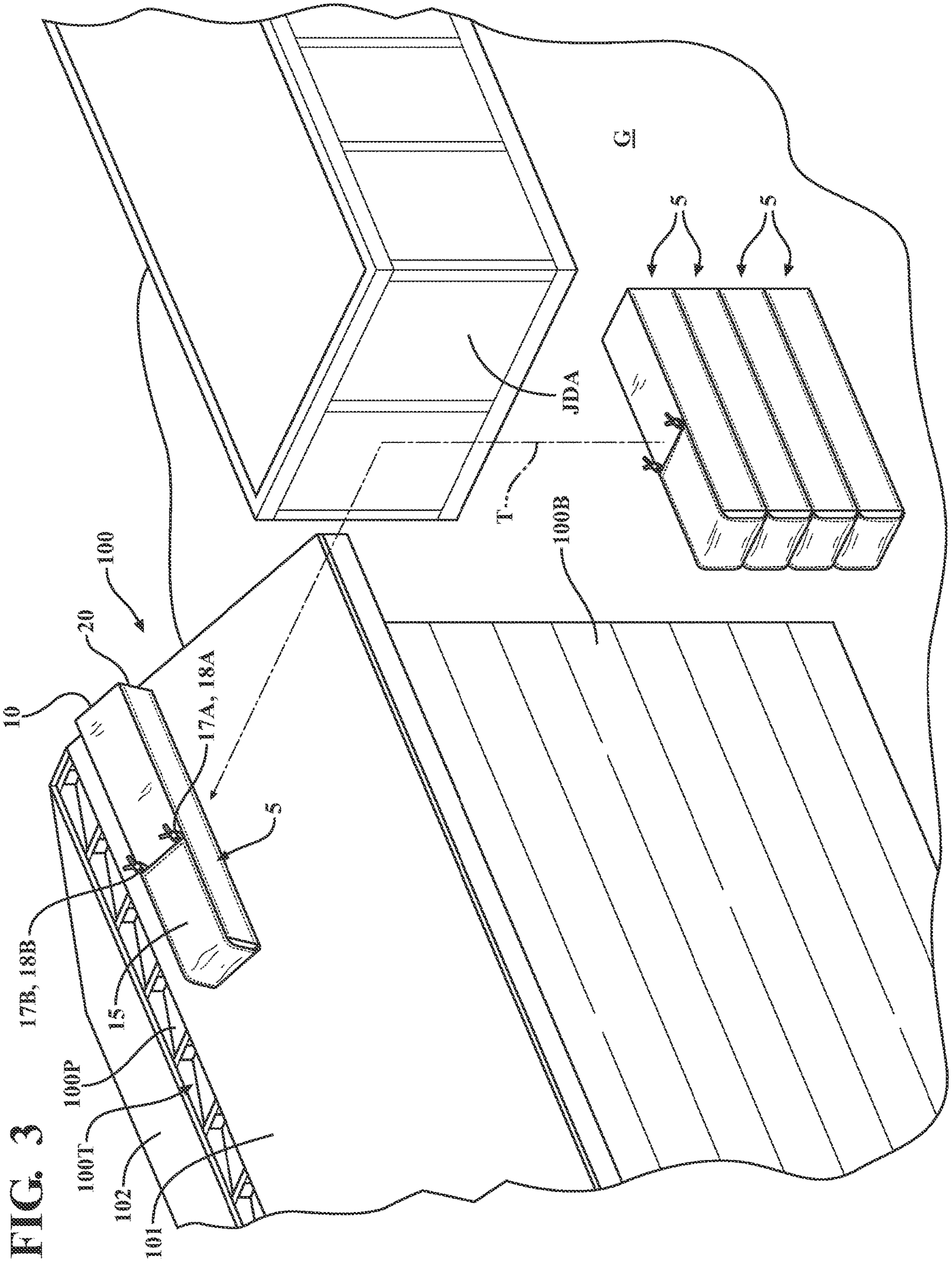
FIG. 3 is a perspective view of ridge vent packages being delivered to a jobsite and transported to a roof in a package mode.

As mentioned above, the body 23 can include a first side 51 and a second side 52 on opposite sides of the longitudinal axis LA. Each ridge vent can include a top plate 27 extending from the first side 51 to the second side 52. The top plate 27 can include a first top plate side 27A and a second top side plate side 27B with a bending region 28 between the first top plate side 27A and the second top plate side 27B. The bending region 28 can overlap the longitudinal axis and can be configured so that the first top plate 27A and the second top plate 27B can move and change in angular orientation relative to one another, for example when the ridge vent 20 is fastened or secured to roof surfaces 101, 102 that are opposite one another at a peak 100P of a roof 100 as shown in FIGS. 3 and 4.

In some cases, when used with the packaging herein, the ridge vents 20 can be present and configured with the first top plate side 27A at an angle A1 relative to the second top plate side 27B. This angle A1 can be optionally 0° to 30°, inclusive, 1° to 15°, inclusive, 1° to 10°, inclusive, or other angles depending on the application. The ridge vents 20 can be disposed and configured with the top plate sides at this angle A1 when packaged in the roof vent package 5 such that due to the angle, the individual ridge vents nest and align with one another along their longitudinal axes so that they do not move or slide relative to one another in the compartment 10C.

As mentioned above, the ridge vent bag 10 and its respective sidewalls and components can be constructed from a flexible bendable material. With reference to FIG. 6, the flexibility of the bag sidewalls, for example the second sidewall 12 allows the contours of the ridge vents 20 stored inside the bag to be reflected through and/or perceivable through the flexible material. For example, the sidewall 12 can be flexible and/or bendable and non-rigid. As a result, when the contours of the 20C1 and 20C2 of the ridge vents 20 engage the sidewall 12, the flexible material from which it is constructed will bend, flex and conform to reflect those contours 20C1 and 20C2 so that they are perceivable and visible to a viewer of the bag 10. The contours 20C1 and 20C2 can correspond to the bending region 28, for example, of the body 23 of the ridge vent 20. The contours however are but one example of the portions of the ridge vents 20 that can be reflected through and perceived by a viewer of the bag. Where other roof vents of different shapes are stored and/or transported in the bag 10, the contours of those vents likewise can be reflected to the flexible material from which the bag is constructed.

Figure 4:
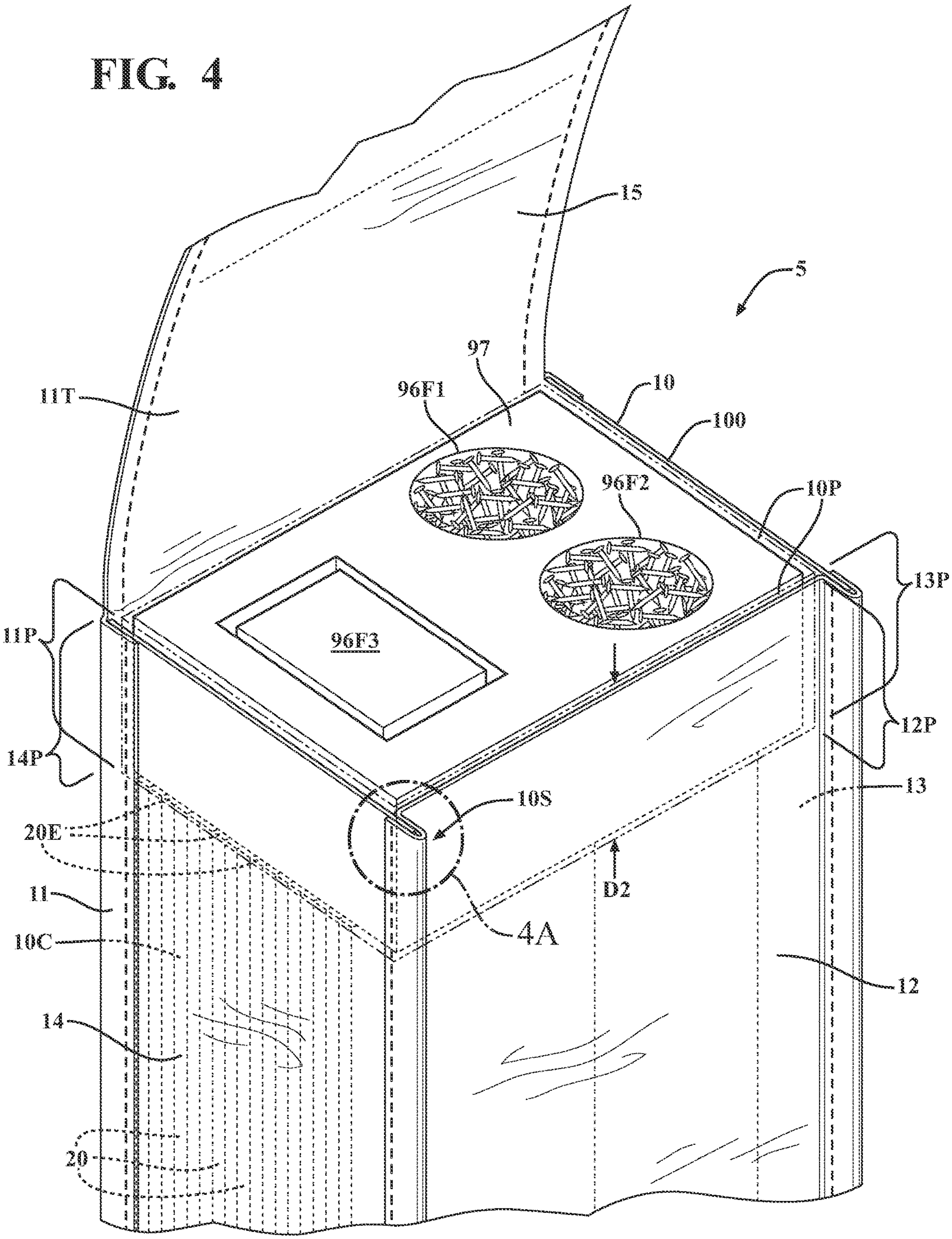
FIG. 4 is a perspective view of a ridge vent package, and in particular, a ridge vent bag, opened to access a receiver pocket and fasteners therein.
Figure 4A:
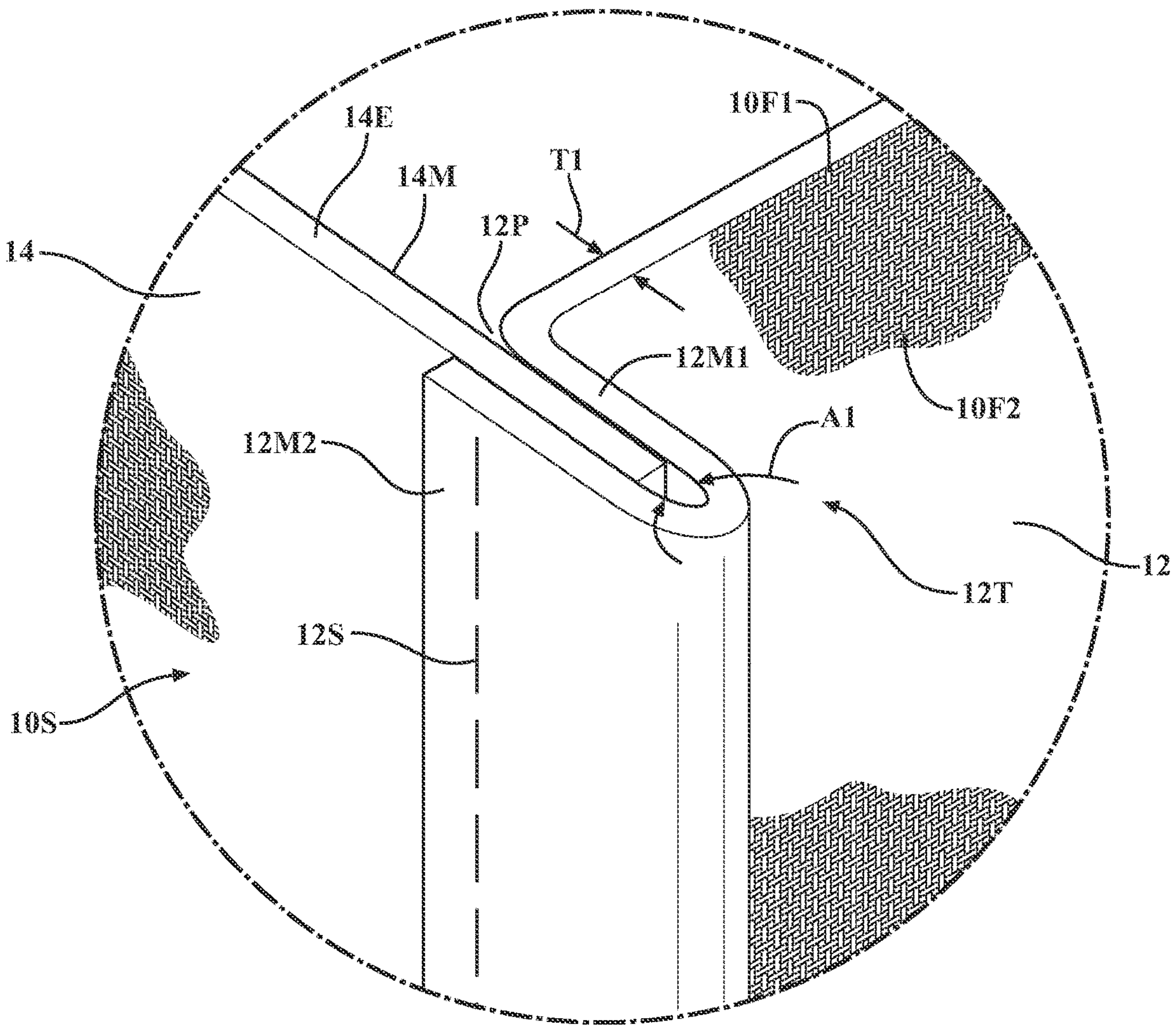
FIG. 4A is a close-up view of sidewalls attached to one another with stitching.
Figure 5:
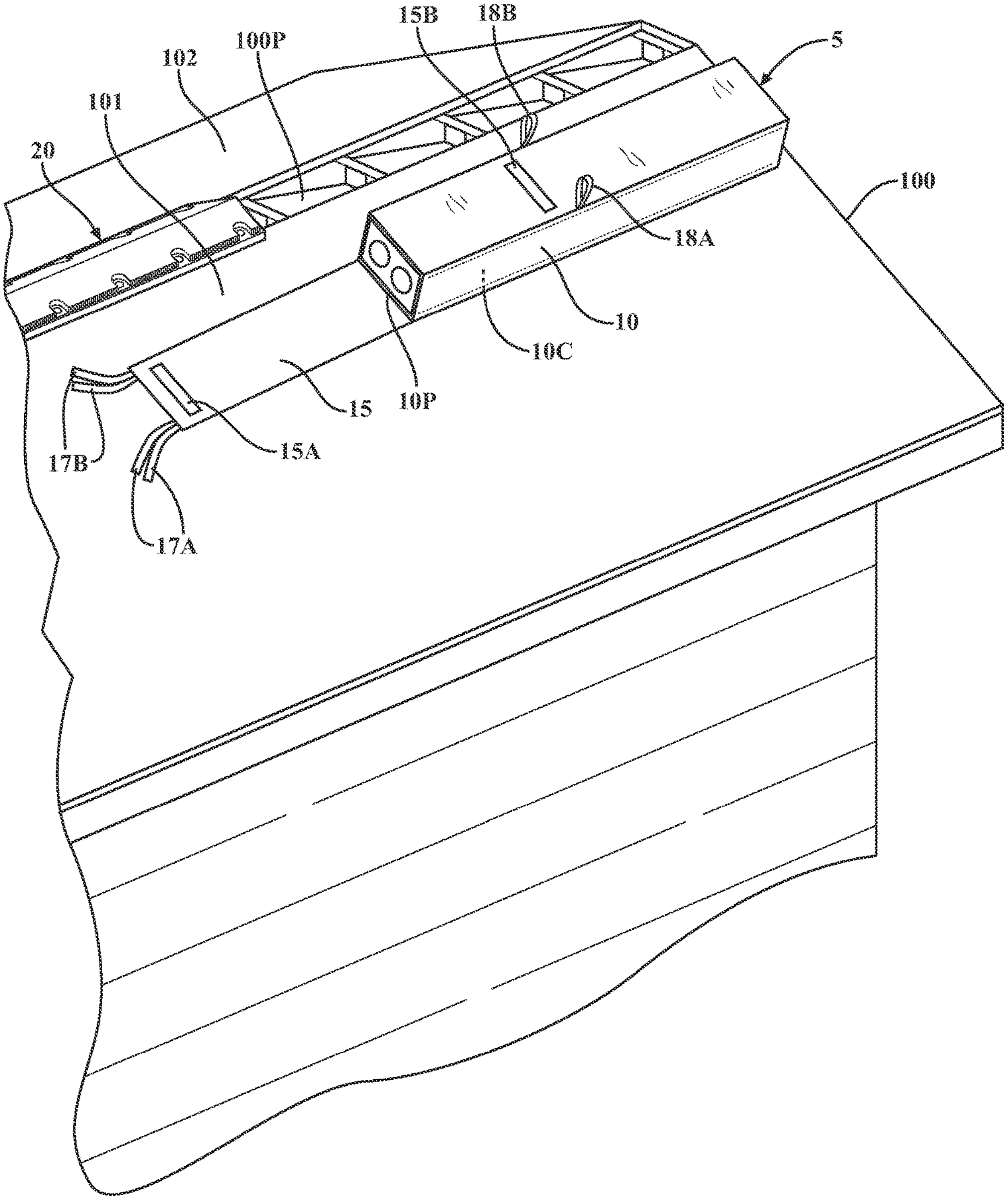
FIG. 5 is a close up perspective view of the receiver pocket and a closure flap in an open mode.

As will be appreciated, the ridge vents 20 used herein can be removed from the ridge vent bag 10 and fastened to corresponding opposing roof surfaces 101 and 102 as shown in FIG. 4 at a peak 100P of a roof 100. Multiple ridge vents 20 can be removed from the bag and installed end to end along the peak 10 to cover that peak. The roof and the ridge vents can be covered with shingles or other roofing materials depending on the application after installation of the ridge vents.

A method of using the roof vent package 5 will now be described with reference to FIGS. 1-8. On a high level, the method can include providing the ridge vent bag 10 constructed from a flexible material, the ridge vent bag including the compartment 10C containing a plurality of ridge vents 20 in stick form therein; and removing the plurality of ridge vents 20 from the compartment 10C such that the compartment is emptied of ridge vents. After removal of the ridge vents from the bag 10, the method can include placing jobsite debris DB in the compartment 10C of the ridge vent bag 10, where the plurality of ridge vents was previously located, to store the jobsite debris in the ridge vent bag 10.

Optionally, the method of using the roof vent package 5 can include providing the ridge vent bag including the ridge vents 20 therein, and any optional fasteners or other items in the receiver pocket 10P. The package 5 can be delivered to a jobsite as shown in FIG. 3. There, the ridge vent packages 5 can be first delivered on a ground level G near a building 100B. Although shown as being placed directly on the ground G, the packages 5 also can be on a truck, trailer or other vehicle before being transported to a roof 100. The packages 5 can be subsequently transported in the direction shown to the roof 100. One or more of the packages can be handed up at a time, depending on the space and size of the roof, as well as the number of workers at the jobsite. Generally, each individual package, including the ridge vent bag 10 can be transported from a ground elevation near the ground G to a roof elevation on or above the roof 100. This transport can occur before the ridge vents 20 are removed from the bag. As shown, the package 5 can be set on a roof surface 101 and left there until the ridge vents 20 inside the package 5 are ready to be removed from the bag 10 and installed.

Optionally, in some applications, the ridge vent bag 10 can be secured to a component of the building and/or the roof 100. For example, as shown in FIG. 3, a first strap 17B can be untied from a corresponding second strap 18B. The second strap 18B can be tied, nailed stapled or otherwise secured to a portion of a truss 100T projecting from the peak 100P. In other applications, the bag can simply be laid on the surfaces of the roof 100.

When a worker is ready to open the bag 10 of the package 5 and remove one or more roof vents 20 from the compartment 10C, the worker can engage the closure flap 15. Where the closure flap is held closed in the closed mode shown in FIG. 3 via one or more straps 17A, 17B, 18A, 18B, the worker can untie those straps or otherwise disassociate them from one another. Where the closure flap 15 includes another closure element, for example, the adhesive elements 15A, 15B described above, the user can disengage those adhesive elements from one another or generally one adhesive element from one of the closure flaps and/or the sidewalls of the bag. The worker can then open the closure flap to the configuration shown in FIG. 5. There, the closure flap 15 is in the open mode.

In this open mode, the worker can access the receiver pocket 10P and/or the internal compartment 10C of the bag 10. Where the package 5 includes items in the receiver pocket 10P, the worker can remove those items. For example, if there are fasteners 96F1, 96F2, 96F3 disposed in a frame 97, the worker can remove the frame 97 from the pocket 10P. The worker can then utilize those fasteners, for example by loading them into a nail pouch or loading them into a roofing nailer, depending on the worker's preference and tools available to the worker. After the optional frame 97 is removed from the receiver pocket 10P, which again may or may not be present, the worker has access to the ridge vents 20 disposed in the internal compartment 10C as shown in FIG. 6. There, with the closure flap 15 open, the worker can remove individual ones of the ridge vents 20 from the internal compartment 10C. Removal can include pulling the individual ridge vents one at a time, or altogether out from the internal compartment 10C. The ridge vents then can be fastened as shown, for example, in FIG. 4 to opposing roof surfaces 101 and 102 across the roof peak 100P using the fasteners included with the package 5 or other fasteners. The ridge vents can be removed from the compartment until the ridge vent bag 10 is emptied of ridge vents.

After removal of the ridge vents from the bag 10, the bag can be fully converted from the package mode to a trash mode. In the trash mode, shown in FIG. 8, a worker W can grasp one or more of the sidewalls 12, 13, 14, for example, at or near the opening 100 of the bag 10. The user can then place or drop jobsite debris DB through the opening 100 so that it enters the compartment. The debris can fall toward the bottom 11B of the bag 10. The user alternatively can grab the flap 15 or some other component of the bag 10 while placing debris DB into the bag through the opening 100. The worker can continue to fill the bag with jobsite debris DB until the bag is full. After the bag is full, the user can close the flap 15 over the opening 100. The user can tie the closure elements, when in the form of straps 17A, 17B, 18A and 18B to close the bag to prevent debris from exiting the bag and being blown or strewn about the jobsite. The bag 10, with the debris DB therein can be placed by the worker in jobsite disposal area JDA. As shown, that disposal area can be in the form of a dumpster. Alternatively, it can be in the form of a trailer, a container, a pickup truck, or some other vehicle, or generally in a designated area on a jobsite where jobsite trash can be disposed.

Figure 8:
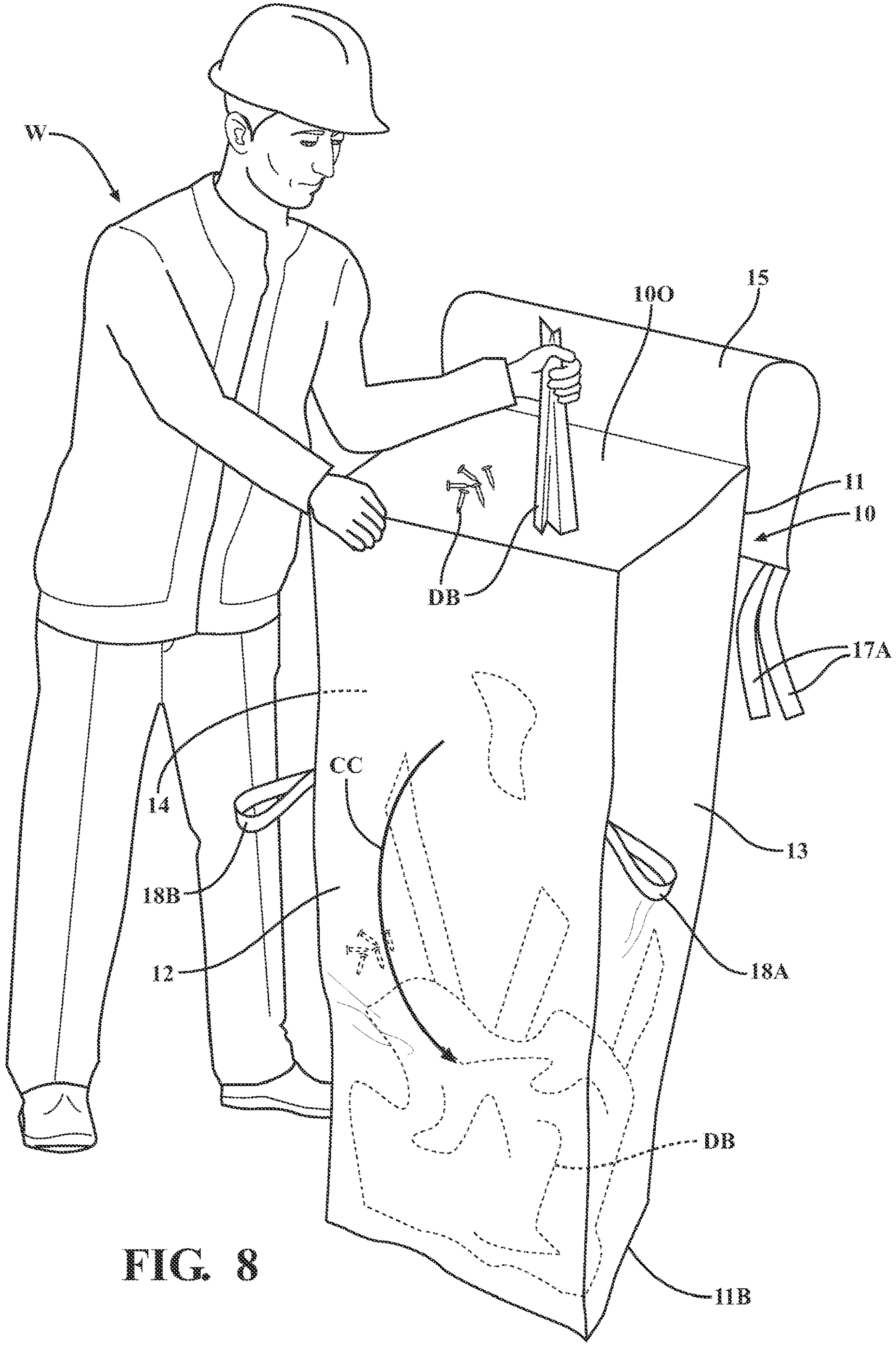
FIG. 8 is a perspective view of a worker placing jobsite debris in an emptied ridge vent bag in a trash mode.
Figure 9:
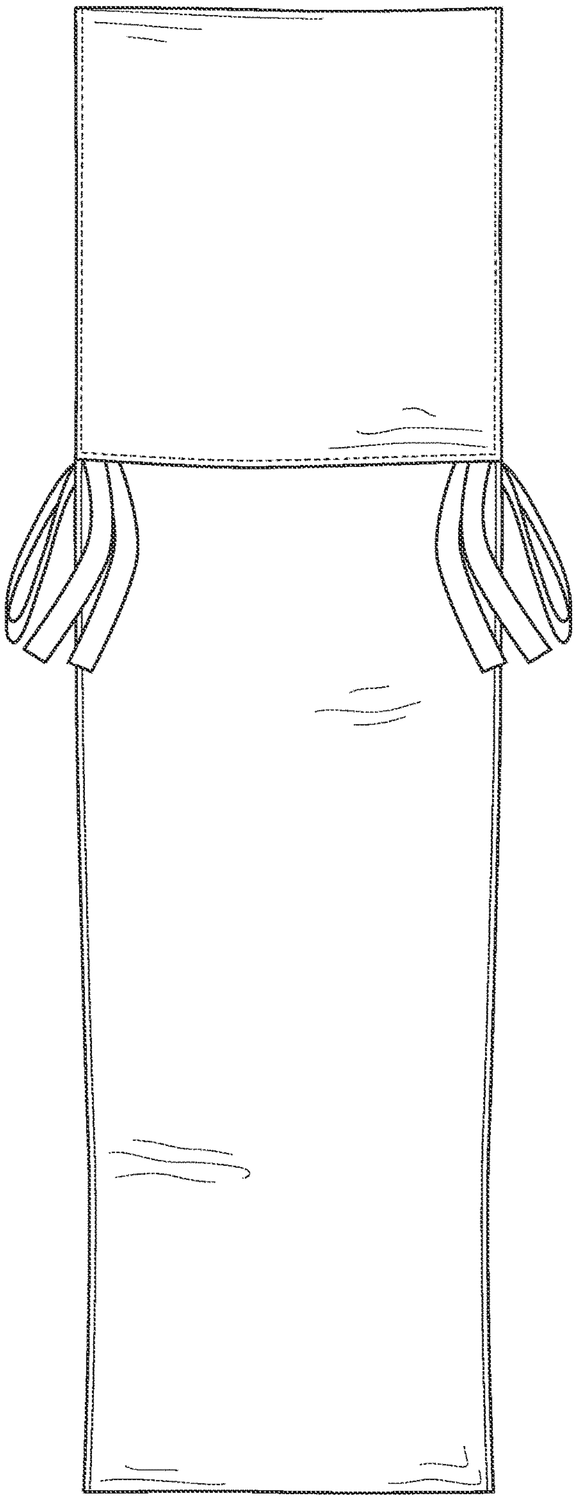
FIG. 9 is a front view of the ridge vent bag.
Figure 10:
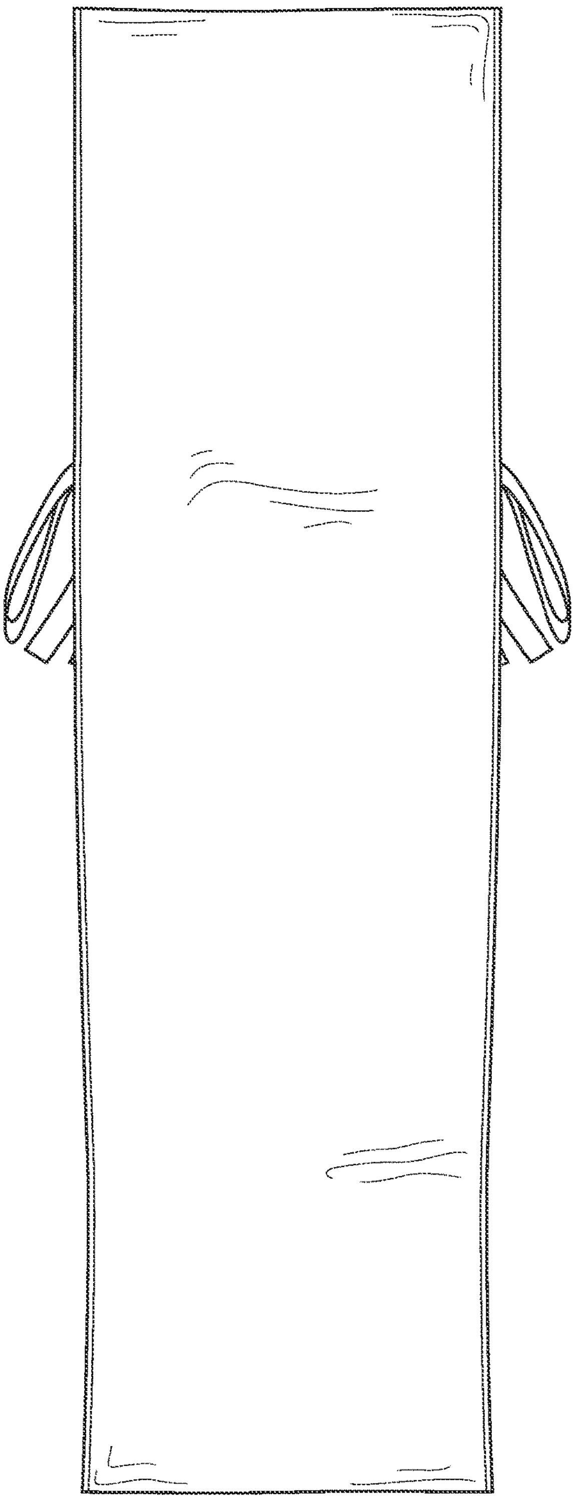
FIG. 10 is a rear view thereof.
Figure 11:
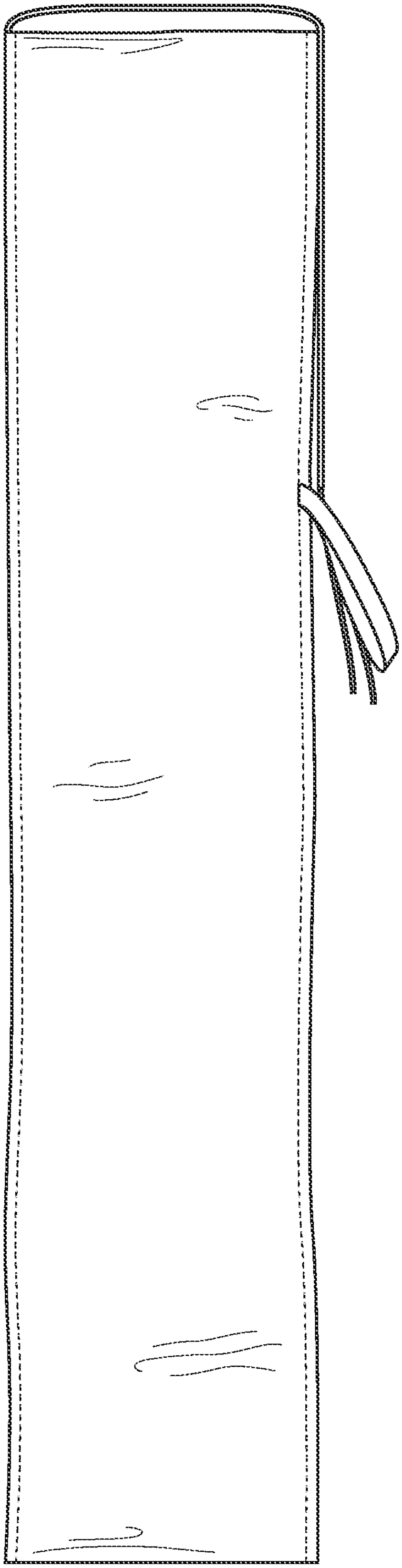
FIG. 11 is a right side view thereof.
Figure 12:
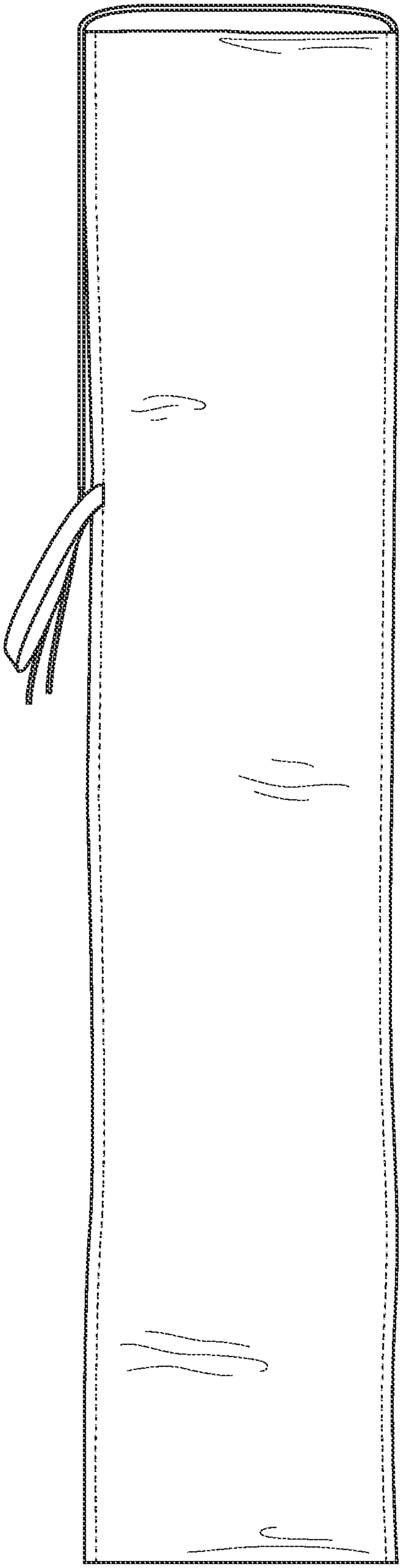
FIG. 12 is a left side view thereof.
Figure 14:
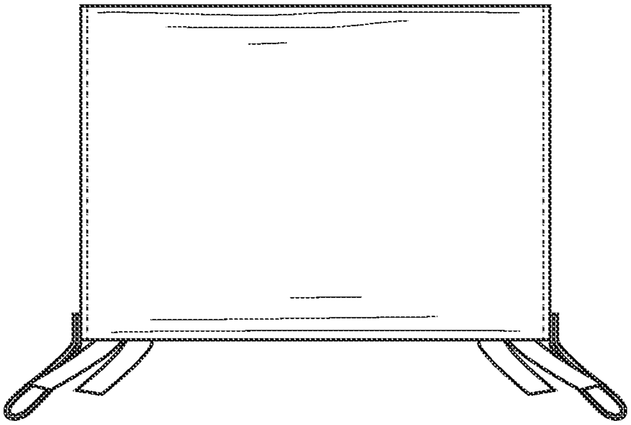
FIG. 14 is a bottom view thereof.
Figure 13:
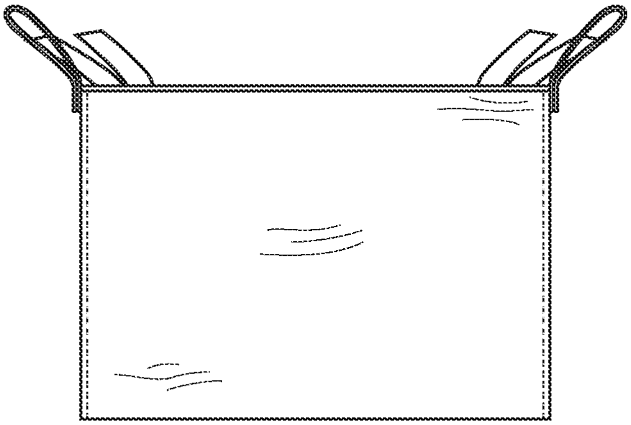
FIG. 13 is a top view thereof.

Optionally, in the trash mode shown in FIG. 8, the ridge vent bag 10 can be collapsed in direction CC upon itself and folded over to reduce the overall size and volume of the bag 10. This can be done when the worker determines that the bag is sufficiently full, or that the bag can no longer support additional debris DB inside the bag despite the minimal volume occupied in the internal compartment 10C.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as “vertical,” “horizontal,” “top,” “bottom,” “upper,” “lower,” “inner,” “inwardly,” “outer” and “outwardly,” are used to assist in describing the invention based on the orientation of the embodiments shown in the illustrations. The use of directional terms should not be interpreted to limit the invention to any specific orientation(s).

In addition, when a component, part or layer is referred to as being “joined with,” “on,” “engaged with,” “adhered to,” “secured to,” or “coupled to” another component, part or layer, it may be directly joined with, on, engaged with, adhered to, secured to, or coupled to the other component, part or layer, or any number of intervening components, parts or layers may be present. In contrast, when an element is referred to as being “directly joined with,” “directly on,” “directly engaged with,” “directly adhered to,” “directly secured to,” or “directly coupled to” another element or layer, there may be no intervening elements or layers present. Other words used to describe the relationship between components, layers and parts should be interpreted in a like manner, such as “adjacent” versus “directly adjacent” and similar words. As used herein, the term “and/or” includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with the embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of the features or that provide all of the stated benefits, except to the extent otherwise expressly set forth in the issued claims. Any reference to claim elements in the singular, for example, using the articles “a,” “an,” “the” or “said,” is not to be construed as limiting the element to the singular. Any reference to claim elements as “at least one of X, Y and Z” is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of using a roof vent package, the method comprising:

providing a ridge vent bag constructed from a flexible material, the ridge vent bag including a plurality of sidewalls forming a compartment, the ridge vent bag including a closure flap extending from a first sidewall to cover an opening of the compartment, the closure flap secured to a second sidewall with a closure element to maintain the closure flap in a closed configuration over the opening, the compartment containing a plurality of ridge vents stacked one upon the other, each ridge vent including a body including a first side, a second side opposite the first side, and a longitudinal axis, each ridge vent including a top plate extending from the first side toward the second side and including first top plate side, a second top plate side and a bending region between the first top plate side and the second top plate side, the bending region overlapping the longitudinal axis and configured so that the first top plate side and the second top plate side can move and change an angular orientation relative to one another;

removing the closure flap relative to the opening so that the compartment and the plurality of ridge vents are visible in the opening for access thereto;

removing the plurality of ridge vents from the compartment such that the compartment is emptied of ridge vents;

placing jobsite debris in the compartment, where the plurality of ridge vents were previously located to store the jobsite debris in the ridge vent bag; and transporting the ridge vent bag containing the jobsite debris to a jobsite disposal area.

2. The method of claim 1, wherein the plurality of sidewalls and the closure flap are constructed from a flexible polymeric fabric, wherein the closure element includes an adhesive element disposed on a first surface of the closure flap, wherein the adhesive element adheres the closure element to the second sidewall, wherein the adhesive element is compromised to disassociate the closure flap from the second sidewall to access the opening.

3. The method of claim 1, wherein the plurality of sidewalls and the closure flap are constructed from a flexible polymeric fabric, wherein the flexible polymeric fabric conforms to a plurality of contours of the body of a ridge vent in the compartment so that the plurality of contours are visible through the ridge vent bag.

4. The method of claim 1, wherein the closure element includes a first strap extending from the closure flap, wherein the plurality of sidewalls includes a second strap, wherein the first strap is tied to the second strap to secure the closure flap in the closed configuration over the opening.

5. The method of claim 4, wherein the removing the closure flap step includes untying the first and second straps.

6. The method of claim 1 comprising:

exposing a receiver pocket that is contiguous with the compartment after the removing the closure flap step, wherein the receiver pocket is located adjacent a plurality of ridge vent ends of the plurality of ridge vents.

7. The method of claim 6 comprising:

removing a plurality of fasteners from the receiver pocket before removing the plurality of ridge vents;

installing the plurality of fasteners through each of the plurality of ridge vents to secure the ridge vents to a peak of a roof.

8. The method of claim 7,
wherein placing jobsite debris in the compartment includes depositing shingle scraps from a roof in the ridge vent bag.

9. The method of claim 1,
wherein the closure element includes a first strap along an end of the closure flap that is folded over the opening of the compartment, and overlapping the second sidewall,
wherein the first strap is untied from a second strap joined with the second sidewall to remove the closure flap.

10. The method of claim 1 comprising:
transporting the ridge vent bag from a ground elevation to a roof elevation above the ground elevation before removing the plurality of ridge vents step; and
placing the ridge vent bag on a roof before removing the plurality of ridge vents step.

11. A method of using a roof vent package, the method comprising:
providing a ridge vent bag constructed from a flexible material, the ridge vent bag including a compartment containing a plurality of ridge vents in stick form therein;
removing the plurality of ridge vents from the compartment such that the compartment is emptied of ridge vents; and
placing jobsite debris in the compartment of the ridge vent bag, where the plurality of ridge vents was previously located, to store the jobsite debris in the ridge vent bag;
transporting the ridge vent bag containing the jobsite debris to a jobsite disposal area; and
installing each of the plurality of ridge vents along a peak of a roof after the removing step.

12. The method of claim 11,
wherein the flexible material is a flexible weaved fabric constructed from polymeric strands,
wherein the flexible material extends over a plurality of contours of the plurality of ridge vents so that the plurality of contours is reflected through the flexible material.

13. The method of claim 12 comprising:
flexibly collapsing the ridge vent bag onto itself to at least partially close the compartment after the placing step.

14. The method of claim 11 comprising:
wherein the ridge vent bag includes a closure element having a first strap along an end of the closure element that is folded over an opening of the compartment, and overlapping a sidewall of the ridge vent bag,
wherein the first strap is untied from a second strap joined with another sidewall to remove the closure element.

15. A roof vent package comprising:
a ridge vent bag constructed from a flexible material, the ridge vent bag including a plurality of sidewalls forming a compartment, the ridge vent bag including a closure flap extending from a first sidewall to cover an opening of the compartment, the closure flap secured to a second sidewall with a closure element to maintain the closure flap in a closed configuration over the opening; and
a plurality of ridge vents stacked one upon the other and removably disposed in the compartment, each ridge vent including a body having a first side, a second side opposite the first side, and a longitudinal axis, each ridge vent including a top plate extending from the first side toward the second side and including first top plate side, a second top plate side and a bending region between the first top plate side and the second top plate side, the bending region overlapping the longitudinal axis and configured so that the first top plate side and the second top plate side can move and change an angular orientation relative to one another,
wherein the ridge vent bag is operable in a package mode in which the plurality of ridge vents are stored in the compartment for transport in the ridge vent bag,
wherein the ridge vent bag is operable in a trash mode in which the plurality of ridge vents are removed from the compartment and the compartment is used to contain jobsite debris.

16. The roof vent package of claim 15,
wherein the closure element includes a first strap along an end of the closure flap that is folded over the opening of the compartment, and overlapping the second sidewall of the ridge vent bag,
wherein the first strap is configured to be untied from a second strap joined with the second sidewall to remove the closure flap from the opening and expose the plurality of ridge vents in the compartment.

17. The roof vent package of claim 15,
wherein the plurality of sidewalls and the closure flap are constructed from a flexible polymeric fabric,
wherein the closure element includes an adhesive element disposed on a first surface of the closure flap,
wherein the adhesive element adheres the closure element to the second sidewall,
wherein the adhesive element is configured to be compromised to disassociate the closure flap from the second sidewall to access the opening.

18. The roof vent package of claim 15,
wherein the first sidewall, the second sidewall and the closure flap are a continuous, homogeneous single piece of the flexible material that extend along a longitudinal axis of the ridge vent bag,
wherein the ridge vent bag includes a third sidewall and a fourth sidewall,
wherein the third sidewall is sewn to the first sidewall and the second sidewall on one side of the longitudinal axis of the ridge vent bag, while the fourth sidewall can be sewn to the first sidewall and the second sidewall on another, opposite side of the longitudinal axis of the ridge vent bag.

* * * * *